United States Patent
Schäfer et al.

(10) Patent No.: US 12,460,770 B2
(45) Date of Patent: Nov. 4, 2025

(54) METHOD FOR OPERATING A TECHNICAL INSTALLATION, AND TECHNICAL INSTALLATION

(71) Applicant: SEW-EURODRIVE GMBH & CO. KG, Bruchsal (DE)

(72) Inventors: Thomas Schäfer, Karlsdorf-Neuthard (DE); Andreas Wanjek, Waghäusel (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 235 days.

(21) Appl. No.: 18/570,812

(22) PCT Filed: May 30, 2022

(86) PCT No.: PCT/EP2022/064654
§ 371 (c)(1),
(2) Date: Dec. 15, 2023

(87) PCT Pub. No.: WO2022/263161
PCT Pub. Date: Dec. 22, 2022

(65) Prior Publication Data
US 2024/0218972 A1    Jul. 4, 2024

(30) Foreign Application Priority Data

Jun. 15, 2021    (DE) .......................... 102021003031.1

(51) Int. Cl.
*F16P 3/14*    (2006.01)
*G01V 8/20*    (2006.01)
(Continued)

(52) U.S. Cl.
CPC ................ *F16P 3/144* (2013.01); *G01V 8/20* (2013.01); *G05D 1/656* (2024.01); *G05D 2105/28* (2024.01)

(58) Field of Classification Search
CPC ........... F16P 3/144; G01V 8/20; G05D 1/656; G05D 2105/28
See application file for complete search history.

(56) References Cited

U.S. PATENT DOCUMENTS 6,166,371 A * 12/2000 Milbrath et al. ......... G01V 8/20
7,932,809 B2 * 4/2011 Nair et al. ............... F16P 3/144
(Continued)

FOREIGN PATENT DOCUMENTS

| AT | 522418 A1 | 10/2020 |
|----|-----------|---------|
| DE | 102016107564 A1 | 10/2017 |

(Continued)

OTHER PUBLICATIONS

European Office Action issued in corresponding EP Patent Application No. 22730556.2, dated Sep. 17, 2024, with English translation.

(Continued)

*Primary Examiner* — Brodie J Follman
(74) *Attorney, Agent, or Firm* — Carter, DeLuca & Farrell LLP

(57) ABSTRACT

In a method for operating a technical installation that includes an outer zone, a danger zone, an access zone which provides for access from the outer zone to the danger zone, a light curtain for monitoring the access zone, and at least one mobile system: a protective field is generated and activated in the access zone by the light curtain before entry of the at least one mobile system into the access zone; when the at least one mobile system approaches the access zone, a mobile communication unit of the at least one mobile system transmits a request signal to a stationary communication unit of the light curtain; and after reception of the request signal by the stationary communication unit the (Continued)

protective field is deactivated by the light curtain. A technical apparatus is configured to carry out the method.

22 Claims, 2 Drawing Sheets

(51) Int. Cl.
*G05D 1/656* (2024.01)
*G05D 105/28* (2024.01)

(56) References Cited

U.S. PATENT DOCUMENTS

| | | |
|---|---|---|
| 11,048,240 B2 | 6/2021 | Zimmermann |
| 2007/0205861 A1 | 9/2007 | Nair |
| 2022/0185601 A1 | 6/2022 | Kirchmayr |

FOREIGN PATENT DOCUMENTS

| | | |
|---|---|---|
| DE | 202018101285 U1 | 6/2019 |
| DE | 202020102721 U1 | 12/2020 |

OTHER PUBLICATIONS

International Search Report issued in corresponding International Application No. PCT/EP2022/064654 dated Sep. 19, 2022, pp. 1-2, English Translation.
Written Opinion issued in corresponding International Application No. PCT/EP2022/064654 dated Sep. 19, 2022, pp. 1-5, English Translation.

* cited by examiner

METHOD FOR OPERATING A TECHNICAL INSTALLATION, AND TECHNICAL INSTALLATION

FIELD OF THE INVENTION

The present invention relates to a method for operating a technical installation and to a technical installation. For example, the technical installation includes an outer zone, a danger zone, an access zone, which provides for access from the outer zone to the danger zone, a light curtain for monitoring the access zone, and at least one mobile system.

The technical installation is, for example, an industrial application, for example, a production plant, an industrial hall, or a logistics center. The mobile system of the technical installation is, for example, an autonomous driving vehicle. The mobile system is used, for example, to transport objects within the technical installation. There are also other objects and people in the technical installation.

BACKGROUND INFORMATION

A method for operating a technical installation is described in German Patent Document No. 10 2019 001 253 and has at least one mobile system movable on a traffic area of the technical installation. The mobile system captures objects in the technical installation with the help of appropriate sensors.

The danger zone is, for example, an area in the technical installation in which dangerous work such as welding is carried out, or in which fast-moving robots are located. In the event of unauthorized access of a person or object from the outer zone through the access zone to the danger zone, for example, a control unit switches off the machines in the danger zone to prevent hazards, damage, and accidents. Such a standstill of the machines in the danger zone causes a loss of production. Such a standstill must be avoided when a mobile system arranged for this purpose moves into the danger zone, for example, to transport material into the danger zone or to transport manufactured products out of the danger zone.

A safety device and a safety method for a production station for car body components are described in German Patent Document No. 10 2016 107 564.

A production device with a production cell for processing workpieces is described in Austrian Patent Document No. 522418.

A monitoring device with a safety sensor designed for monitoring a protective field arranged in a plane is described in German Patent Document No. 20 2020 102 721.

SUMMARY

Example embodiments of the present invention provide a method for operating a technical installation, and a technical installation.

According to example embodiments of the present invention, a method serves for operating a technical installation that incudes an outer zone, a danger zone, an access zone, which provides for access from the outer zone to the danger zone, a light curtain for monitoring the access zone, and at least one mobile system. A protective field is generated and activated in the access zone by the light curtain before entry of the at least one mobile system into the access zone. When the at least one mobile system approaches the access zone, a mobile communication unit of the at least one mobile system transmits a request signal to a stationary communication unit of the light curtain to temporarily deactivate the protective field. After reception of the request signal by the stationary communication unit, the protective field is deactivated by the light curtain.

The method provides for an authorized mobile system authorized to travel from the outer zone to the danger zone, as well as in the opposite direction, i.e., from the danger zone to the outer zone, for example, for transporting objects, by temporarily deactivating the protective field. In this regard, the mobile system transmits the request signal directly to the light curtain. Cooperation with a higher-level control system, e.g., an additional data exchange with another control unit, via a higher-level communication system, e.g., a field bus, is not required. This, for example, reduces data traffic via a higher-level communication system of the technical installation.

According to example embodiments, after reception of the request signal by the stationary communication unit, the protective field is partially deactivated by the light curtain. For example, a part of the protective field is deactivated which is located at the bottom, i.e., close to the floor. The remaining part of the protective field, which is at the top, i.e., facing away from the floor, remains activated. The part of the protective field which is being deactivated is dimensioned such that the mobile system, including its load, can travel through the access zone without entering the remaining part of the protective field. In this regard, the mobile communication unit of the mobile system transmits information about its height, including its load, together with the request signal.

According to example embodiments, after reception of the request signal by the stationary communication unit the protective field is completely deactivated by the light curtain, i.e., regardless of the height of the mobile system. It is not necessary to transmit information about the height of the mobile system including its load.

According to example embodiments, after the mobile system exits from the access zone, the protective field is reactivated. Thus, after the mobile system exits from the access zone, regular monitoring of the access zone is ensured again.

According to example embodiments, the request signal is transmitted from the mobile communication unit of the at least one mobile system to the stationary communication unit of the light curtain by light communication. The mobile communication unit includes an LED, for example, for emitting a luminous flux. The stationary communication unit includes a photocell, for example, for receiving a luminous flux.

According to example embodiments, when the at least one mobile system approaches the access zone, the mobile communication unit of the at least one mobile system transmits the request signal to the stationary communication unit of the light curtain when the at least one mobile system is at a certain distance from the protective field. This distance is relatively small. The request signal is thus transmitted only immediately before entry into the access zone.

The distance is, for example, determined such that no person and no further mobile system fits between the approaching mobile system and the protective field. Thus, it is ruled out that a person or another mobile system is located between the approaching mobile system and the protective field when the request signal is transmitted. Thus, even while the authorized mobile system is traveling through the access zone, unauthorized entry by a person or another mobile system is detectable. This, for example, improves the safety and reliability of the technical installation.

According to example embodiments, a detection unit of the at least one mobile system detects when the at least one mobile system is at the determined distance from the protective field by detecting a marking which is arranged stationary with respect to the light curtain. This marking is, for example, applied in the immediate vicinity of the protective field. For example, the marking is placed such that no person as well as no other mobile system fits between the marking and the protective field. The marking is arranged, for example, as a transponder, a barcode, or a QR code, and is applied to the floor. The detection unit is arranged accordingly to detect this marking.

According to example embodiments of the present invention, a technical installation includes an outer zone, a danger zone, an access zone which provides for access from the outer zone to the danger zone, a light curtain for monitoring the access zone, and at least one mobile system. The technical apparatus is configured to carry out the method described herein.

In a technical installation, a mobile system authorized is permitted to travel from the outer zone to the danger zone, as well as in the opposite direction, i.e., from the danger zone to the outer zone, for example, for transporting objects, by temporarily deactivating the protective field. Cooperation with a higher-level control system, e.g., an additional data exchange with another control unit, via a higher-level communication system, e.g., a field bus, is not required. This, for example, makes it possible to reduce data traffic via a higher-level communication system of the technical installation.

According to example embodiments, the mobile system is arranged as an autonomous driving vehicle, which has a drive device, an electrical energy store for supplying power to the drive device, and a control device for controlling the drive device. The drive device includes, for example, an electric motor, a gearbox, and drive wheels. The mobile system is, for example, arranged as a driverless transport system for transporting objects within the technical installation.

For example, the mobile system arranged as an autonomous driving vehicle further includes a device for determining its position within the technical installation. Thus, it is possible to determine the position of the mobile system, e.g., relative to the light curtain.

According to example embodiments, the at least one mobile system has a mobile communication unit for transmitting a request signal by light communication. For this purpose, the mobile communication unit includes an LED, for example, for emitting a luminous flux.

According to example embodiments, the light curtain has a stationary communication unit for receiving a request signal by light communication. For this purpose, the stationary communication unit includes, for example, a photocell for receiving a luminous flux.

According to example embodiments, the at least one mobile system has a detection unit for detecting a marking, which is arranged stationary with respect to the light curtain. The detection unit is adapted to detect a corresponding marking. For example, the detection unit is adapted to detect transponders, barcodes, or QR codes.

Further features and aspects of example embodiments of the present invention are explained in more detail below with reference to the appended schematic Figures.

DETAILED DESCRIPTION

Figure 1:
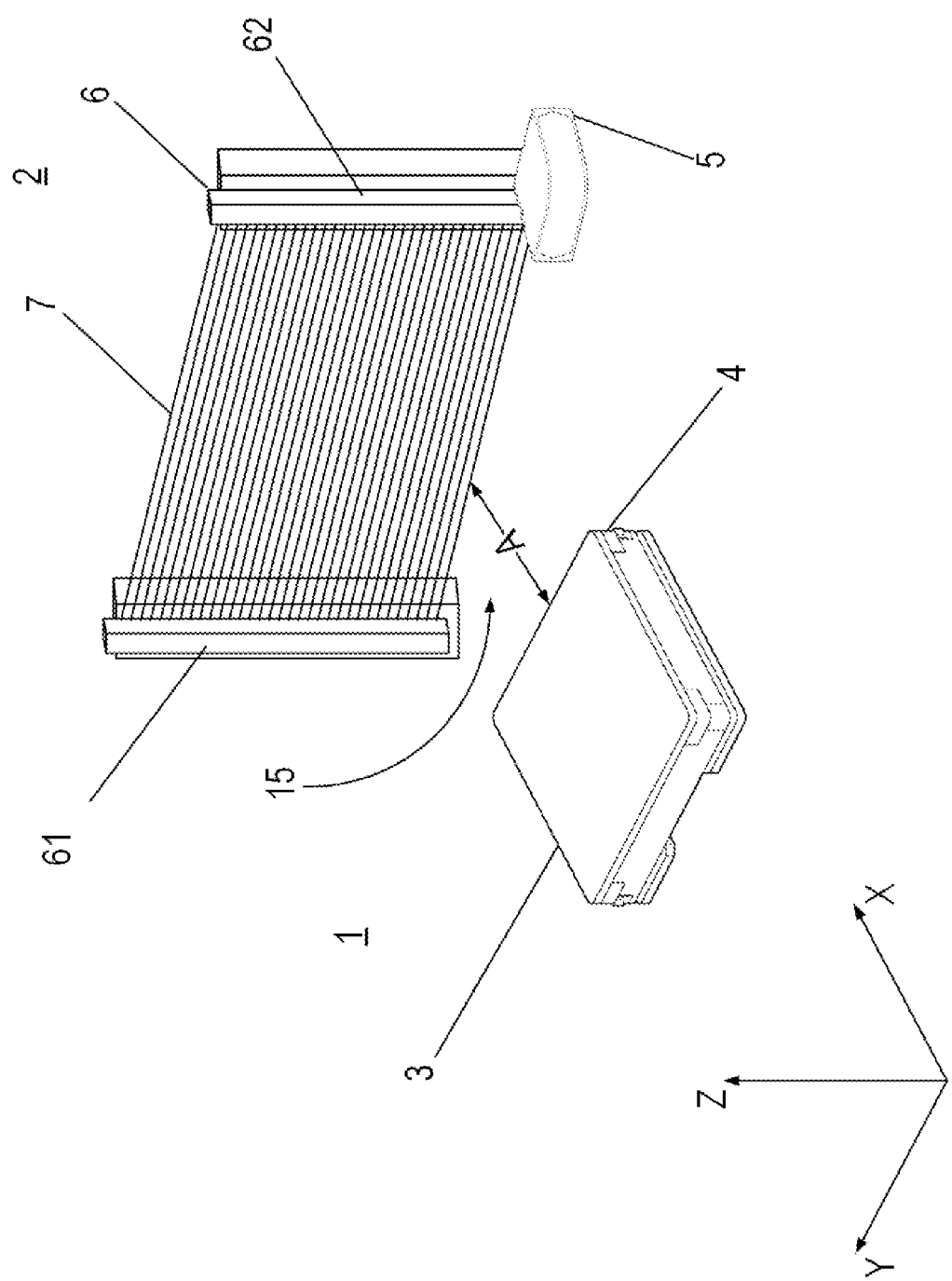
FIG. 1 illustrates a technical installation when a mobile system approaches an access zone.

FIG. 1 schematically illustrates a technical installation when a mobile system 3 approaches an access zone 15. The technical installation is, for example, an industrial application, for example, a production plant, an industrial hall, or a logistics center. The technical installation includes, for example, an outer zone 1 and a danger zone 2. Through the access zone 15, access is possible from the outer zone 1 to the danger zone 2 as well as from the danger zone 2 to the outer zone 1.

The outer zone 1 includes traffic routes that can be freely used by people and objects, for example, forklifts or mobile systems 3. The danger zone 2 is an area in the technical installation in which dangerous work, such as, for example, welding, is carried out, or in which fast-moving robots or manipulators are located.

The danger zone 2 is separated from the outer zone 1 by a light curtain 6. The light curtain 6 is used to monitor the access zone 15. The light curtain 6 includes a first column 61 and a second column 62. The first column 61 and the second column 62 are offset from each other in a cross direction Y on a flat floor and extend parallel to each other in a vertical direction Z. The access zone 15 is located between the columns 61, 62.

A cross direction Y extends perpendicular to the vertical direction Z. A longitudinal direction X extends perpendicular to the vertical direction Z and perpendicular to the cross direction Y.

The technical installation further includes several mobile systems 3, each arranged as an autonomous driving vehicle. For example, the mobile systems 3 are used to transport material for producing products or to transport manufactured products within the technical installation. FIG. 1, for simplicity, illustrates only one such mobile system 3. The mobile system 3 is illustrated in FIG. 1 as being located in the outer zone 1 and moves in a direction of travel, which corresponds to the longitudinal direction X, towards the access zone 15 and the danger zone 2.

The mobile system 3 includes a drive device for driving the mobile system 3, which drive device has an electric motor, a gearbox, and drive wheels. The mobile system 3 further includes an electrical energy store for supplying electrical energy to the drive device. The mobile system 3 also includes a control device for controlling the drive device.

The first column 61 of the light curtain 6 includes a plurality of laser diodes, which are arranged offset from each other in the vertical direction Z. The second column 62 of the light curtain 6 includes a plurality of photodiodes, which are arranged offset from each other in the vertical direction Z. The laser diodes emit laser beams in the cross direction Y. The light curtain 6 generates a protective field 7 by the columns 61, 62 and the laser beams, by which the access zone 15 is monitored.

As long as there is no object in the access zone 15, the laser beams strike respectively photodiode. In the event of unauthorized access of a person or object to the access zone 15, some or all of the laser beams are interrupted and thus some or all of the photodiodes are not struck by a laser beam. Unauthorized access of a person or object, e.g., a mobile system 3, from the outer zone 1 through the access zone 15 to the danger zone 2 is thus detected by the protective field 7.

Before entry of the mobile system 3 into the access zone 15, the protective field 7 is activated. If unauthorized access is detected by the activated protective field 7, a warning message is generated and, if necessary, the machines in the danger zone 2 are also switched off in this case in order to prevent hazards, damage, and accidents.

For example, the mobile system 3 has a rectangular cross-section. As illustrated in FIG. 1, the mobile system 3 moves in a direction of travel corresponding to the longitudinal direction X and approaches the access zone 15. For example, the mobile system 3 is located at a distance A from the protective field 7. A front side of the mobile system 3 facing the protective field 7 is distanced by the distance A from the protective field 7.

The mobile system 3 has a mobile communication unit 4 for communication with the light curtain 6. For this purpose, the mobile communication unit 4 includes, for example, an LED for emitting a luminous flux for light communication. The mobile communication unit 4 is arranged at the front side of the mobile system 3.

The light curtain 6 has a stationary communication unit 5 for communication with the mobile system 3. For this purpose, the stationary communication unit 5 includes, for example, a photocell for receiving a luminous flux for light communication. For example, the stationary communication unit 5 is arranged at the second column 62 of the light curtain 6.

For example, the mobile system 3 is authorized to enter or, respectively, to drive in the danger zone 2. When approaching the access zone 15, a request signal is transmitted from the mobile communication unit 4 of the mobile system 3 to the stationary communication unit 5 of the light curtain 6 by light communication. This request signal is received by the stationary communication unit 5 of the light curtain 6. In response, the protective field 7 is deactivated by the light curtain 6.

Access of a person or object, e.g., a mobile system 3, from the outer zone 1 through the access zone 15 to the danger zone 2 is also detected by the deactivated protective field 7. However, no warning message is generated by the deactivated protective field 7 when such an access is detected. Authorized access is assumed.

Figure 2:
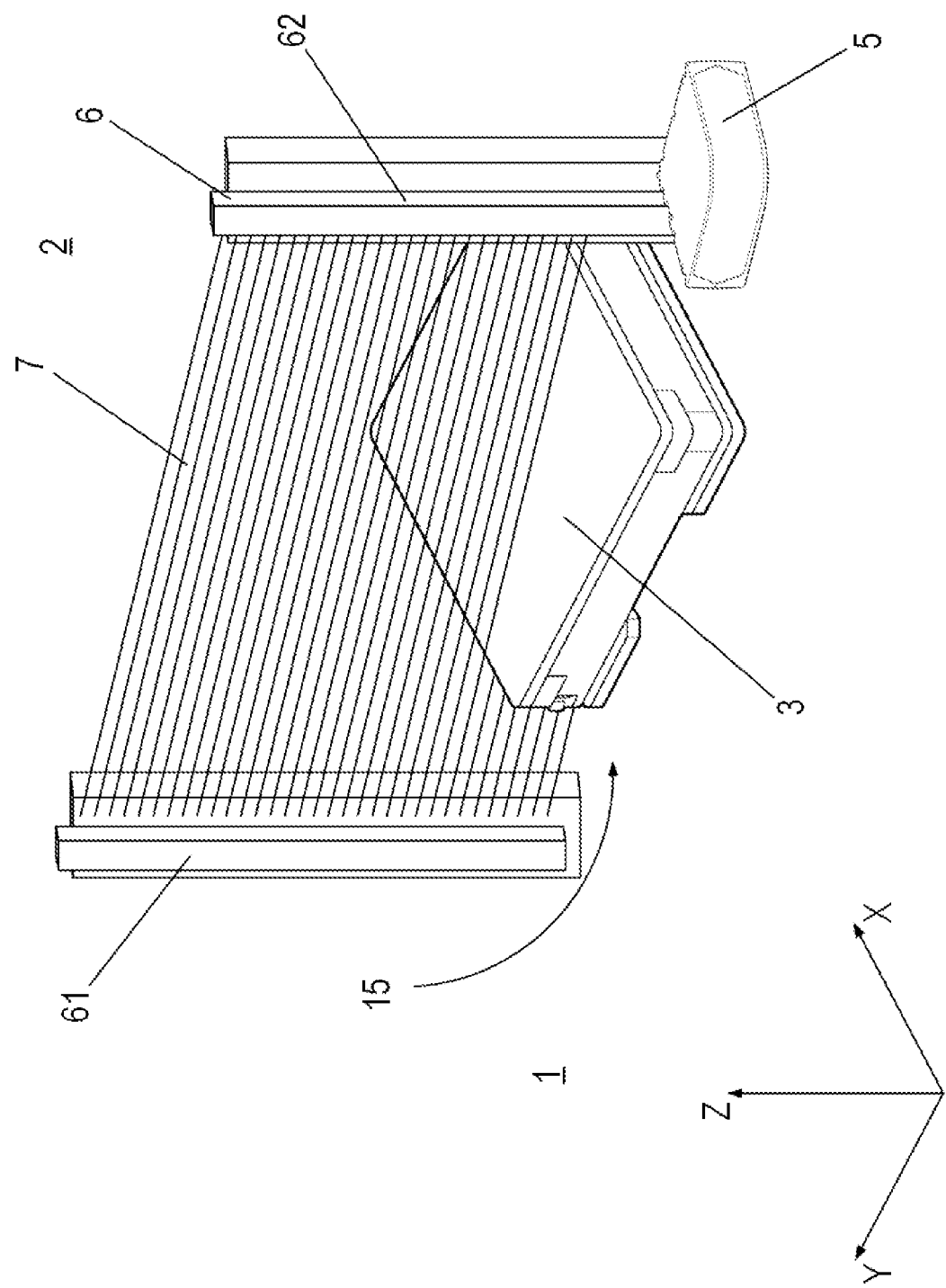
FIG. 2 illustrates the technical installation while the mobile system is traveling through the access zone.

FIG. 2 schematically illustrates the technical installation while the mobile system 3 travels from the outer zone 1 through the access zone 15 to the danger zone 2. For example, the protective field 7 is partially deactivated by the light curtain 6. In particular, a part of the protective field 7, which is located in the vertical direction Z at the bottom, i.e., close to the floor, is deactivated. The remaining part of the protective field, which is at the top, i.e., facing away from the floor, remains activated. Alternatively, it is possible that the protective field 7 is completely deactivated by the light curtain 6.

The mobile system 3 has a height which corresponds to an extension in the vertical direction Z. The part of the protective field 7 which is being deactivated is dimensioned such that the mobile system 3, including its load, can travel through the access zone 15 without entering the remaining part of the protective field 7. This part of the protective field 7, which is being deactivated, thus has a slightly greater extension in the vertical direction Z than the mobile system 3, including its load. Alternatively, as mentioned above, it is possible that the protective field 7 is completely deactivated by the light curtain 6, regardless of the height of the mobile system 3.

After the mobile system 3 exits from the access zone 15 into the danger zone 2, the protective field 7 is completely activated again. When the mobile system 3 travels from the danger zone 2 through the access zone 15 to the outer zone 1, the protective field is deactivated in the same manner. After the mobile system 3 exits from the access zone 15 into the outer zone 1, the protective field 7 is completely activated again.

LIST OF REFERENCE CHARACTERS

1 Outer zone
2 Danger zone
3 Mobile system
4 Mobile communication unit
5 Stationary communication unit
6 Light curtain
7 Protective field
15 Access zone
61 First column
62 Second column
A Distance
X Longitudinal direction
Y Cross direction
Z Vertical direction

The invention claimed is:

1. A method for operating a technical installation that includes an outer zone, a danger zone, an access zone that provides access from the outer zone to the danger zone, a light curtain adapted to monitor the access zone, and at least one mobile system, comprising:
   generating and activating a protective field in the access zone by the light curtain before entry of the mobile system into the access zone;
   in response to approach by the mobile system to the access zone, transmitting, by a mobile communication unit of the mobile system, a request signal to a stationary communication unit of the light curtain to temporarily deactivate the protective field; and
   in response to reception of the request signal by the stationary communication unit, deactivating the protective field by the light curtain.

2. The method according to claim 1, wherein the protective field is partially deactivated by the light curtain in response to the reception of the request signal by the stationary communication unit.

3. The method according to claim 1, wherein the protective field is completely deactivated by the light curtain in response to the reception of the request signal by the stationary communication unit.

4. The method according to claim 1, further comprising reactivating the protective field in response to an exit of the mobile system from the access zone.

5. The method according to claim 1, wherein the request signal is transmitted from the mobile communication unit of the mobile system to the stationary communication unit of the light curtain by light communication.

6. The method according to claim 1, wherein, in response to the approach of the mobile system to the access zone and in response to the mobile system being a predetermined distance from the protective field, the mobile communication unit of the mobile system transmits the request signal to the stationary communication unit of the light curtain.

7. The method according to claim 6, further comprising detecting, by a detection unit of the mobile system, in response to the mobile system being at the predetermined determined distance from the protective field, by detecting a marking, that is stationary with respect to the light curtain.

8. The method according to claim 1, wherein the at least one mobile system includes a plurality of mobile systems.

9. The method according to claim 1, wherein the mobile system includes an autonomous driving vehicle.

10. The method according to claim 9, wherein the autonomous driving vehicle includes a drive device, an electrical energy storage device adapted to supply power to the drive device, and a control device adapted to control the drive device.

11. A system, comprising
an outer zone;
a danger zone;
an access zone that provides access from the outer zone to the danger zone;
a light curtain adapted to monitor the access zone; and
at least one mobile system;
wherein the system is adapted to perform the method recited in claim 1.

12. The system according to claim 11, wherein the mobile system includes an autonomous driving vehicle.

13. The system according to claim 12, wherein the autonomous driving vehicle includes a drive device, an electrical energy storage device adapted to supply power to the drive device, and a control device adapted to control the drive device.

14. The system according to claim 11, wherein the mobile system includes a mobile communication unit adapted to transmit a request signal by light communication.

15. The system according to claim 11, wherein the light curtain includes a stationary communication unit adapted to receive a request signal by light communication.

16. The system according to claim 11, wherein the mobile system includes a detection unit adapted to detect a marking arranged stationary with respect to the light curtain.

17. The system according to claim 11, wherein the at least one mobile system includes a plurality of mobile systems.

18. The system according to claim 14, wherein the mobile communication unit includes an LED adapted to transmit the request signal.

19. The system according to claim 15, wherein the mobile communication unit includes a photocell adapted to receive the request signal.

20. The system according to claim 11, wherein the light curtain includes a first column and a second column that are offset from each other in a horizontal direction and that extend parallel to each other in a vertical direction.

21. The system according to claim 20, wherein the first column includes a plurality of light sources arranged offset from each other in the vertical direction, and the second column includes a corresponding plurality of light sensors arranged offset from each other in the vertical direction.

22. The system according to claim 21, wherein the light sources include laser diodes, and the light sensors include photocells.

* * * * *